(12) United States Patent
Hsiang et al.

(10) Patent No.: US 12,007,663 B2
(45) Date of Patent: Jun. 11, 2024

(54) DISPLAY APPARATUS

(71) Applicant: Acer Incorporated, New Taipei (TW)

(72) Inventors: Jui-Chieh Hsiang, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/302,808

(22) Filed: Apr. 19, 2023

(65) Prior Publication Data

US 2024/0118583 A1   Apr. 11, 2024

(30) Foreign Application Priority Data

Oct. 7, 2022 (TW) .................................. 111138223

(51) Int. Cl.
    *G02B 6/10*     (2006.01)
    *G02F 1/29*     (2006.01)
    *G03B 30/00*     (2021.01)

(52) U.S. Cl.
    CPC ............... *G02F 1/292* (2013.01); *G02B 6/10* (2013.01); *G03B 30/00* (2021.01); *G02F 2202/28* (2013.01)

(58) Field of Classification Search
    CPC ....... G02F 2202/28; G02F 1/292; G02B 6/10; G03B 30/00
    See application file for complete search history.

(56) References Cited

U.S. PATENT DOCUMENTS

| 2017/0176669 | A1* | 6/2017 | Chung | ................. G02B 6/0068 |
| 2022/0082883 | A1 | 3/2022 | Takimoto et al. | |
| 2022/0214476 | A1* | 7/2022 | Sasata | ..................... G02B 1/113 |
| 2023/0142069 | A1* | 5/2023 | Fan | ..................... G02B 27/0012 |
| | | | | 359/567 |

FOREIGN PATENT DOCUMENTS

| CN | 109188711 | 1/2019 |
| CN | 111221140 | 6/2020 |
| CN | 210983445 | 7/2020 |
| WO | 2022049906 | 3/2022 |

* cited by examiner

*Primary Examiner* — Mariam Qureshi
(74) *Attorney, Agent, or Firm* — JCIPRNET (57) ABSTRACT

A display apparatus including a display panel, a camera module, and a diffraction suppression device is provided. The display panel is provided with multiple signal lines and multiple display pixels. The signal lines and the display pixels are alternately arranged along at least one direction. The camera module has a light receiving surface facing the display panel. The light receiving surface is overlapped with the display panel. The diffraction suppression device is disposed between the display panel and the camera module, and has multiple first light-transmitting regions and multiple second light-transmitting regions alternately arranged along the at least one direction. The first light-transmitting regions are respectively overlapped with the display pixels. The second light-transmitting regions are respectively overlapped with the signal lines. The diffraction suppression device has a first refractive index in the first light-transmitting regions and a second refractive index in the second light-transmitting regions. The first refractive index is greater than the second refractive index.

12 Claims, 8 Drawing Sheets

DISPLAY APPARATUS

CROSS-REFERENCE TO RELATED APPLICATION

This application claims the priority benefit of Taiwan application serial no. 111138223, filed on Oct. 7, 2022. The entirety of the above-mentioned patent application is hereby incorporated by reference herein and made a part of this specification.

BACKGROUND

Technical Field

The invention relates to a display apparatus, and more particularly, to a display apparatus with an under-screen camera module.

Description of Related Art

In order to increase a screen-to-body ratio of a display to achieve a slim border design, an apparatus such as a notebook computer or a smart phone with a camera module disposed under a display screen is proposed. However, when a pixel resolution of the display is relatively high, light is likely to be diffracted after passing through a densely arranged pixel array, which will affect quality of a photographed image.

SUMMARY

The invention provides a display apparatus with an under-screen photographing function, and a photographed image has good quality.

The invention provides a display apparatus including a display panel, a camera module, and a diffraction suppression device. The display panel is provided with multiple signal lines and multiple display pixels. The signal lines and the display pixels are alternately arranged along at least one direction. The camera module has a light receiving surface facing the display panel. The light receiving surface is overlapped with the display panel. The diffraction suppression device is disposed between the display panel and the camera module. The diffraction suppression device has multiple first light-transmitting regions and multiple second light-transmitting regions alternately arranged along the at least one direction. The first light-transmitting regions are respectively overlapped with the display pixels. The second light-transmitting regions are respectively overlapped with the signal lines. The diffraction suppression device has a first refractive index in the first light-transmitting regions and has a second refractive index in the second light-transmitting regions. The first refractive index is greater than the second refractive index.

In an embodiment of the invention, the diffraction suppression device of the display apparatus includes a liquid crystal layer. The liquid crystal layer includes multiple first portions respectively disposed in the first light-transmitting regions and multiple second portions respectively disposed in the second light-transmitting regions. An arrangement pitch of the first portions along the at least one direction is equal to an arrangement pitch of the display pixels along the at least one direction.

In an embodiment of the invention, the diffraction suppression device of the display apparatus further includes at least one substrate, and an orthogonal projection area of each of the first portions and the second portions of the liquid crystal layer on the at least one substrate changes over time.

In an embodiment of the invention, the display pixels of the display apparatus include a first display pixel and a second display pixel adjacent to each other. In a first time interval, an orthogonal projection area of one of the first portions overlapped with the first display pixel on the at least one substrate is greater than an orthogonal projection area of another one of the first portions overlapped with the second display pixel on the at least one substrate.

In an embodiment of the invention, in a second time interval, the orthogonal projection area of the one of the first portions overlapped with the first display pixel on the at least one substrate is smaller than the orthogonal projection area of the another one of the first portions overlapped with the second display pixel on the at least one substrate.

In an embodiment of the invention, the camera module performs one image capture in the first time interval and the second time interval.

In an embodiment of the invention, the camera module of the display apparatus includes a light sensor and a lens. The light sensor is provided with the light receiving surface. The lens is disposed on one side of the light receiving surface of the light sensor and is overlapped with the light receiving surface. The diffraction suppression device is integrated in the camera module and includes a substrate and a liquid crystal layer. The liquid crystal layer is clamped between the substrate and the lens.

In an embodiment of the invention, the substrate of the diffraction suppression device and the lens of the camera module are connected through an adhesive pattern to form a sealed chamber. The sealed chamber is filled with the liquid crystal layer.

In an embodiment of the invention, the light sensor is coupled to a microcontroller. The diffraction suppression device is coupled to a timing control chip. The microcontroller and the timing control chip are synchronized in timing.

In an embodiment of the invention, the camera module further comprises a filter disposed between the light sensor and the lens.

In an embodiment of the invention, the first light-transmitting regions of the diffraction suppression device of the display apparatus are respectively provided with multiple light guide structures.

In an embodiment of the invention, an arrangement pitch of the light guide structures of the display apparatus along the at least one direction is equal to an arrangement pitch of the display pixels along the at least one direction.

In an embodiment of the invention, each of the light guide structures of the display apparatus has a refractive surface facing one of the second light-transmitting regions and a light incident surface facing the display panel. The refractive surface and the light incident surface are connected with each other and have an included angle, and the included angle is within a range of 30 degrees to 60 degrees.

In an embodiment of the invention, the camera module of the display apparatus includes a light sensor and a lens. The light sensor is provided with the light receiving surface. The lens is disposed on one side of the light receiving surface of the light sensor and is overlapped with the light receiving surface. The diffraction suppression device is integrated in the camera module, and the light guide structures are connected to the lens.

In an embodiment of the invention, the camera module further comprises a filter disposed between the light sensor and the lens.

Based on the above, in the display apparatus of an embodiment of the invention, the diffraction suppression device is disposed between the display panel and the camera module. The diffraction suppression device has the first light-transmitting regions disposed to be overlapped with the display pixels of the display panel and the second light-transmitting regions disposed between the display pixels. Since the refractive index of the first light-transmitting region is greater than that of the second light-transmitting region, a light path of light is deflected after the light passes through the first light-transmitting region, thereby suppressing the diffraction phenomenon of the light generated after passing through the display pixels of the display panel, which helps to improve the image photographing quality of the under-screen camera module.

DESCRIPTION OF THE EMBODIMENTS

In the drawings, the thickness of layers, films, panels, regions, etc., are exaggerated for clarity's sake. It will be understood that when a component such as a layer, a film, a region, or a substrate is referred to be "on" or "connected to" another component, it may be directly on or connected to the other another component, or intermediate components may also exist there between. Comparatively, when a component is referred to be "directly on" or "directly connected" to another, none other intermediate component exits there between. As used herein, the "connection" may refer to physical and/or electrical connection. Furthermore, "electrical connection" of two components may refer to that other components may exist between the two components.

Reference will now be made in detail to the present preferred embodiments of the invention, examples of which are illustrated in the accompanying drawings. Wherever possible, the same reference numbers are used in the drawings and the description to refer to the same or like parts.

Figure 1:
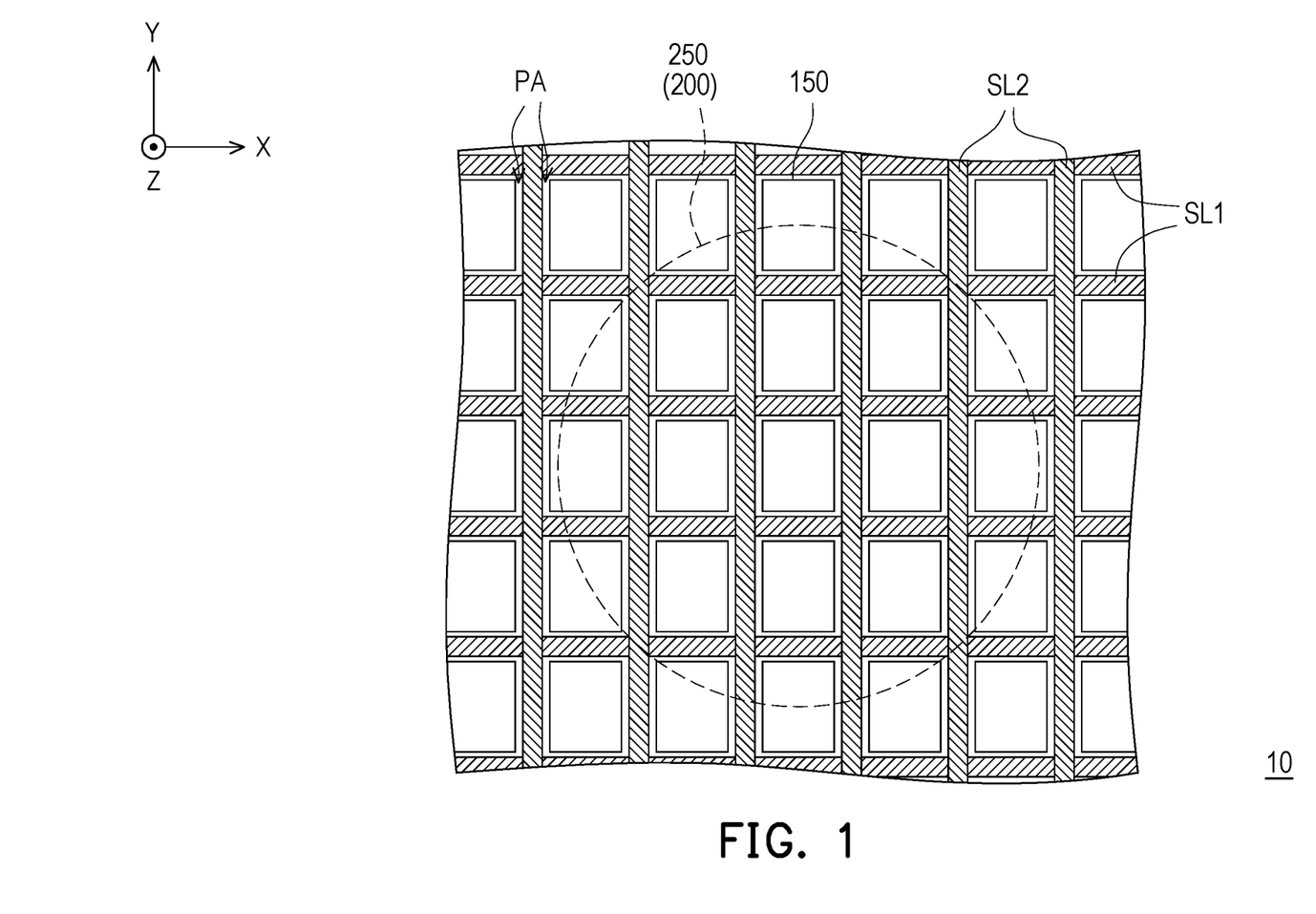
FIG. 1 is a schematic top view of a display apparatus according to a first embodiment of the invention.
Figure 2:
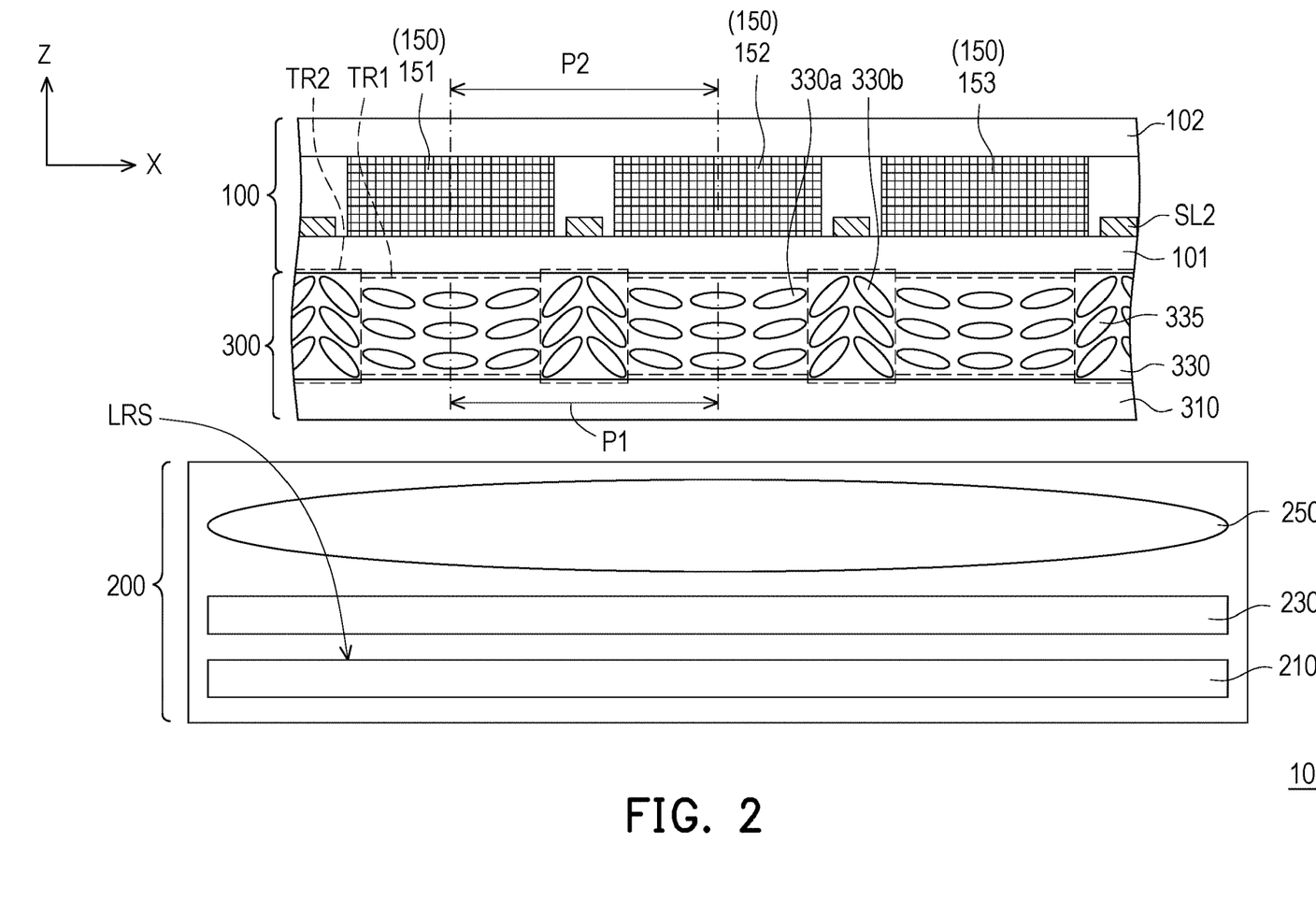
FIG. 2 is a schematic cross-sectional view of the display apparatus in FIG. 1.
Figure 3A:
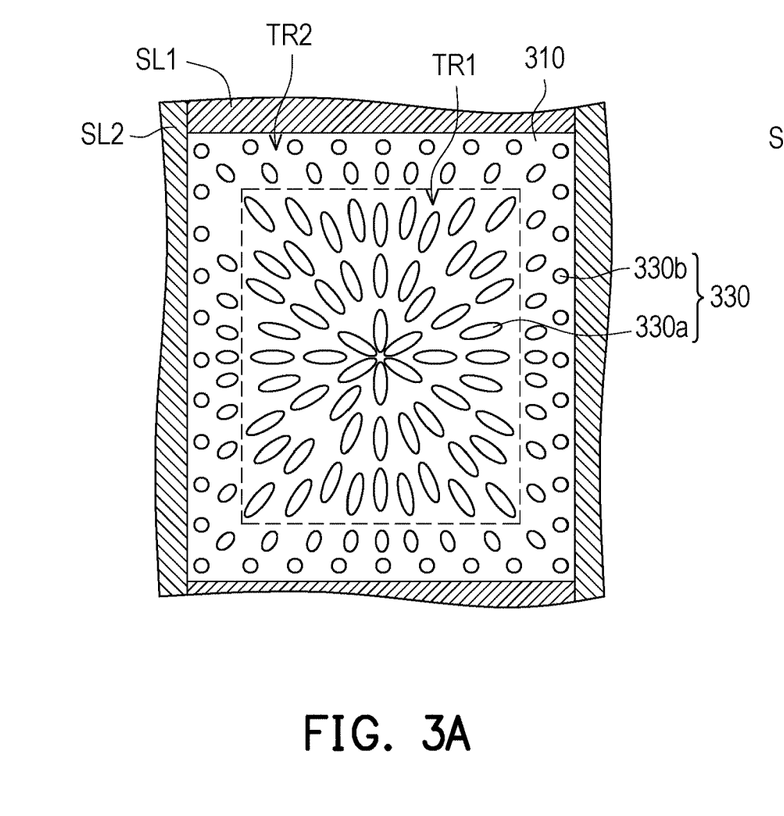
FIG. 3A and FIG. 3B are arrangement states of a first portion and a second portion of a liquid crystal layer in a diffraction suppression device at different time.
Figure 3B:
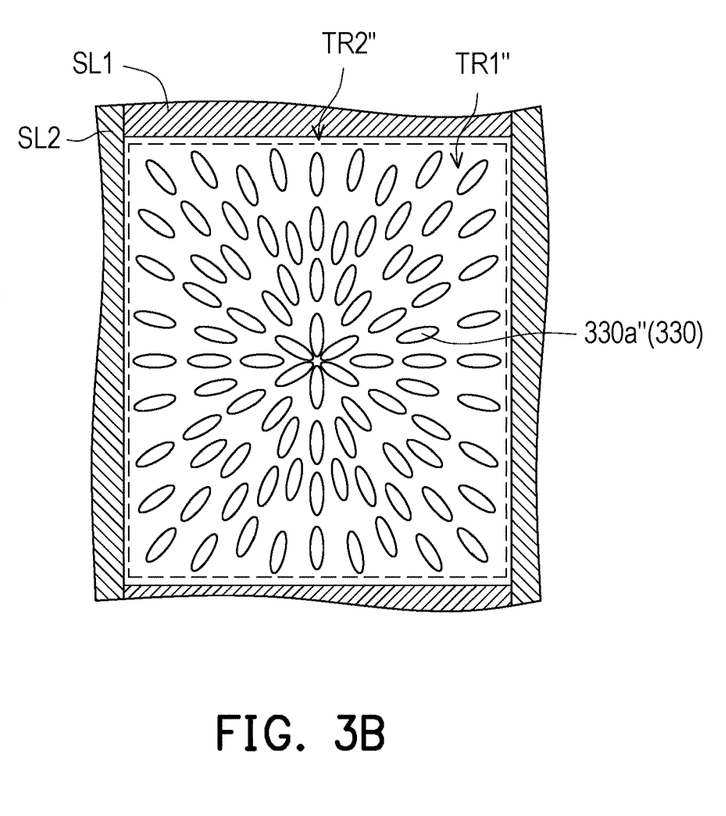
Figure 4A:
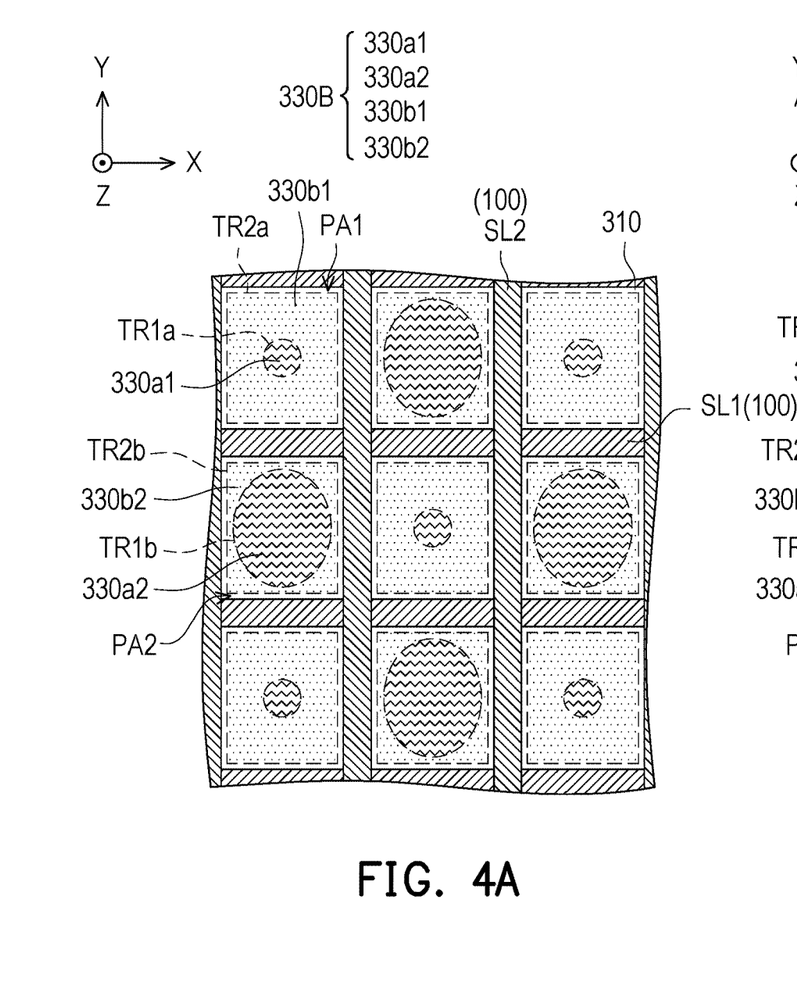
FIG. 4A and FIG. 4B are distribution states of multiple first light-transmitting regions and multiple second light-transmitting regions of a diffraction suppression device at different time in another embodiment.
Figure 4B:
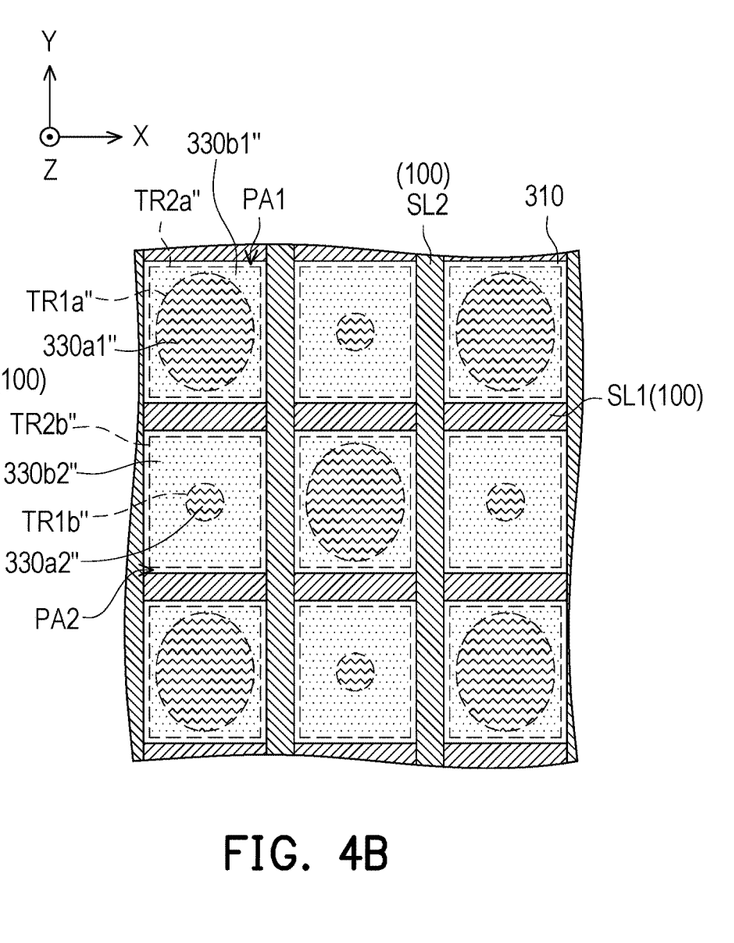
Figure 5:
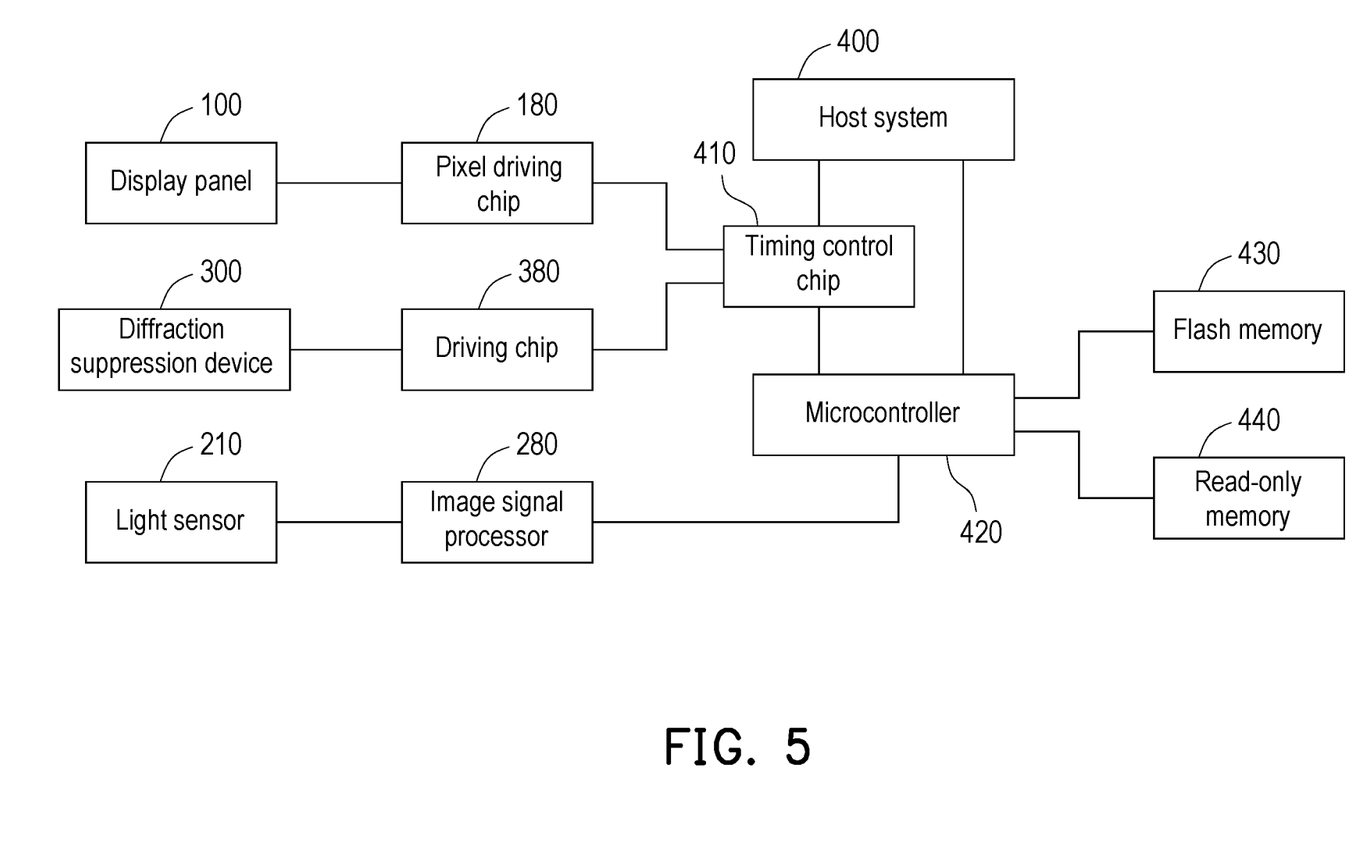
FIG. 5 is a block view of the display apparatus in FIG. 2.

FIG. 1 is a schematic top view of a display apparatus according to a first embodiment of the invention. FIG. 2 is a schematic cross-sectional view of the display apparatus in FIG. 1. FIG. 3A and FIG. 3B are arrangement states of a first portion and a second portion of a liquid crystal layer in a diffraction suppression device at different time. FIG. 4A and FIG. 4B are distribution states of multiple first light-transmitting regions and multiple second light-transmitting regions of a diffraction suppression device at different time in another embodiment. FIG. 5 is a block view of the display apparatus in FIG. 2. For clarity's sake, FIG. 1 only illustrates signal lines SL1 and SL2, display pixels 150 of the display panel 100 and a lens 250 of a camera module 200 of FIG. 2.

Referring to FIG. 1 and FIG. 2, the display apparatus 10 includes a display panel 100 and a camera module 200. The camera module 200 is provided with a light receiving surface LRS facing the display panel 100, and the display panel 100 is disposed by overlapping the light receiving surface LRS. The camera module 200 is disposed on one side of the display panel 100 away from a display surface, and is adapted to receive light from the side of the display surface and passing through the display panel 100. Namely, the display apparatus 10 has an under-screen photographing function.

The display panel 100 is provided with multiple signal lines SL1, multiple signal lines SL2, and multiple display pixels 150. In the embodiment, the signal lines SL1 are arranged on the substrate 101 along a direction Y and extend in a direction X, and the signal lines SL2 are arranged on the substrate 101 along the direction X and extend in the direction Y. The signal lines SL1 are intersected with the signal lines SL2 to define multiple pixel areas PA. The display pixels 150 are respectively disposed in the pixel areas PA. Namely, the signal lines and the display pixels 150 are alternately arranged along at least one direction.

In the embodiment, the display pixels 150 may include multiple first display pixels 151, multiple second display pixels 152, and multiple third display pixels 153 arranged alternately along the direction X. The first display pixels 151, the second display pixels 152 and the third display pixels 153 are respectively used to display different colors, such as red, green and blue, but the invention is not limited thereto. The display panel 100 may further include another substrate 102 disposed on a light emitting side of the display pixels 150.

For example, the display pixels 150 may be micro light emitting diodes (micro LEDs) or organic light emitting diodes (OLEDs). Namely, the display panel 100 may be a self-luminous display panel, but the invention is not limited thereto. In other embodiments, the display panel may also be other suitable light transmissive display panels, such as a liquid crystal display panel. In the embodiment, the signal lines SL1 and the signal lines SL2 are, for example, scan lines and data lines, and may be electrically connected to the display pixels 150 via multiple pixel circuits (not shown), so as to realize individual control of the display pixels 150, but the invention is not limited thereto.

On the other hand, the camera module 200 may include a light sensor 210 and a lens 250, where the light sensor 210 is provided with a light receiving surface LRS facing the display panel 100, and the lens 250 is disposed on one side of the light receiving surface LRS of the light sensor 210, and is overlapped with the light receiving surface LRS. In the embodiment, a filter 230 may also be provided between the light sensor 210 and the lens 250. The filter 230 is, for example, an infrared cut-off filter, but the invention is not limited thereto.

In order to suppress a diffraction phenomenon generated after light passes through the display pixels 150 of the display panel 100, a diffraction suppression device 300 is further provided between the display panel 100 and the camera module 200. The diffraction suppression device 300 has multiple first light-transmitting regions TR1 and multiple second light-transmitting regions TR2 arranged alternately along at least one direction (for example, the direction X and/or the direction Y). In the embodiment, the light-transmitting regions TR1 are respectively overlapped with the display pixels 150 of the display panel 100 along z direction Z, and the second light-transmitting regions TR2 are respectively overlapped with the signal lines SL2 (or signal line SL1) along the direction Z.

It should be noted that the diffraction suppression device 300 respectively has a first refractive index and a second refractive index in the first light-transmitting regions TR1 and the second light-transmitting regions TR2, and the first refractive index is greater than the second refractive index. The refractive index here is, for example, a material average refractive index of the diffraction suppression device 300 in the corresponding light-transmitting region.

In the embodiment, the diffraction suppression element 300 may include a substrate 310 and a liquid crystal layer 330. The liquid crystal layer 330 is clamped between the substrate 310 and the substrate 101 of the display panel 100 and includes multiple first portions 330a and multiple second portions 330b. The first portions 330a are respectively disposed in the first light-transmitting regions TR1, and the second portions 330b are respectively disposed in the second light-transmitting regions TR2. From another point of view, distribution ranges of the first portions 330a of the liquid crystal layer 330 may respectively define the first light-transmitting regions TR1, and distribution ranges of the second portions 330b of the liquid crystal layer 330 may respectively define the second light-transmitting regions TR2.

For example, an arrangement pitch P1 of the first portions 330a of the liquid crystal layer 330 along the direction X may be equal to an arrangement pitch P2 of the display pixels 150 of the display panel 100 along the direction X. Although not shown in the drawing, an arrangement pitch of the first portions 330a of the liquid crystal layer 330 along the direction Y may also be equal to an arrangement pitch of the display pixels 150 of the display panel 100 along the direction Y.

In detail, an average refractive index generated by an alignment state of multiple liquid crystal molecules 335 in the first portion 330a of the liquid crystal layer 330 is defined as the first refractive index of the diffraction suppression device 300, and an average refractive index generated by an alignment state of the liquid crystal molecules 335 in the second portion 330b of the liquid crystal layer 330 is defined as the second refractive index of the diffraction suppression device 300. In particular, the arrangement and distribution of the liquid crystal molecules 335 in the liquid crystal layer 330 may be adjusted through electrical control. Namely, the diffraction suppression device 300 may also be provided with multiple electrode structures (not shown) on the substrate 310 and/or the substrate 101, and these electrode structures are respectively arranged corresponding to the display pixels 150. Since the implementation of the electrode structures depends on a required arrangement state of the liquid crystal molecules 335, it is not limited by the invention.

Since the average refractive index (i.e. the first refractive index) of the liquid crystal layer 330 in the first light-transmitting region TR1 overlapped with each display pixel 150 is greater than the average refractive index (i.e., the second refractive index) of the liquid crystal layer 330 in the second light-transmitting region TR2 overlapped with the adjacent signal line, the light is easily deflected when it is transmitted to a border of the first light-transmitting region TR1 and the second light-transmitting region TR2, and the light is incident on the light receiving surface LRS of the camera module 200 in a more straight direction. Namely, a light path of the light after passing through the display pixels 150 of the display panel 100 may be corrected to suppress an influence of a diffraction effect on image photographing quality of the camera module 200.

Referring to FIG. 2, FIG. 3A and FIG. 3B, in the embodiment, an orthogonal projection area of the first portion 330a and the second portion 330b of the liquid crystal layer 330 on the substrate 310 may change over time. For example, distribution ranges of the first portion 330a and the second portion 330b of the liquid crystal layer 330 overlapped with a same display pixel 150 may be alternately changed in timing according to a distribution method of FIG. 3A and a distribution method of FIG. 3B. For example, in a first time interval, the first light-transmitting region TR1 provided with the first portion 330a of the liquid crystal layer 330 and the second light-transmitting region TR2 provided with the second portion 330b of the liquid crystal layer 330 may exist simultaneously (as shown in FIG. 3A). Then, in a second time interval, the arrangement and distribution of the liquid crystal layer 330 is changed, so that a first light-transmitting region TR1" provided with a first portion 330a" almost occupies the pixel area defined by the signal lines SL1 and the signal lines SL2 of the display panel 100 (as shown in FIG. 1), and a second light-transmitting region TR2" is substantially distributed only at positions overlapping with the signal lines (as shown in FIG. 3B). Deduced by analogy, the state switching in FIG. 3A and FIG. 3B is repeated in timing.

Through the above-mentioned operation method of the liquid crystal layer 330, the light path of the light after passing through the display panel 100 may be changed over time, so that a distribution of the light path in space is uniform, thereby reducing the influence of the diffraction effect on image photographing.

On the other hand, in a same time interval (or time point), the orthogonal projection areas of the first light-transmitting regions (or the second light-transmitting regions) corresponding to different display pixels 150 on the substrate 310 may also be different. Referring to FIG. 4A and FIG. 4B, in another modified embodiment of the display panel 100, the pixel areas defined by the signal lines SL1 and the signal lines SL2 may include multiple first pixel areas PA1 and multiple second pixel areas PA2 alternately arranged along the direction X and the direction Y. The first pixel areas PA1 are respectively provided with multiple first display pixels (such as a part of the display pixels 150 in FIG. 1), and the second pixel areas PA2 are respectively provided with multiple second display pixels (such as another part of the pixel 150 in FIG. 1).

It should be noted that an orthogonal projection area of a first portion 330a1 (or a first light-transmitting region TR1a) of a liquid crystal layer 330B in the first pixel area PA1 on the substrate 310 may be different from an orthogonal projection area of a first portion 330a2 (or a first light-transmitting region TR1b) of the liquid crystal layer 330B in the second pixel area PA2 on the substrate 310, and an orthogonal projection area of a second portion 330b1 (or a second light-transmitting region TR2a) of the liquid crystal layer 330B in the first pixel area PA1 on the substrate 310 may be different from an orthogonal projection area of a second portion 330b2 (or a second light-transmitting region TR2b) of the liquid crystal layer 330B in the second pixel area PA2 on the substrate 310.

In addition, a size relationship of the distribution ranges of the two first light-transmitting regions (or the two second light-transmitting regions) in the first pixel area PA1 and the second pixel area PA2 adjacent to each other may be switched in timing. For example, in the first time interval, the orthogonal projection area of the first portion 330a1 overlapped with the first pixel area PA1 on the substrate 310 is smaller than the orthogonal projection area of the first portion 330a2 overlapped with the second pixel area PA2 on the substrate 310, and the orthogonal projection area of the second portion 330b1 overlapped with the first pixel area PA1 on the substrate 310 is greater than the orthogonal projection area of the second portion 330b2 overlapped with the second pixel area PA2 on the substrate 310 (as shown in FIG. 4A).

Then, in the second time interval, the arrangement state of the liquid crystal layer 330B is switched, and an orthogonal projection area of a first portion 330a1" (or a first light-transmitting region TR1a") overlapped with the first pixel area PA1 on the substrate 310 is greater than an orthogonal projection area of a first portion 330a2" (or a first light-transmitting region TR1b") overlapped with the second pixel area PA2 on the substrate 310, and an orthogonal projection area of a second portion 330b1" (or a second light-transmitting region TR2a") overlapped with the first pixel area PA1 on the substrate 310 is smaller than an orthogonal projection area of a second portion 330b2" (or a second light-transmitting region TR2b") overlapped with the second pixel area PA2 on the substrate 310 (as shown in FIG. 4B). Deduced by analogy, the state switching of FIG. 4A and FIG. 4B is repeated in timing.

Through the above-mentioned operation method of the liquid crystal layer 330B, light path distribution of the light passing through different display pixels of the display panel 100 may be further averaged to achieve the purpose of uniformizing the amount of light transmitted by different display pixels, thereby reducing the influence of the diffraction effect on image photographing.

A control system that may realize the above-mentioned operation methods will be exemplarily described below. Referring to FIG. 2 and FIG. 5, for example, the display panel 100 is coupled to a pixel driving chip 180 to receive a driving signal for driving the display pixels 150. The light sensor 210 is coupled to a microcontroller 420 through an image signal processor 280, and a captured image is subjected to signal processing and transmitted to the microcontroller 420. The diffraction suppression device 300 is coupled to the driving chip 380 to receive a voltage signal for driving the liquid crystal layer 330. The pixel driving chip 180, the driving chip 380 and the microcontroller 420 are all coupled to a timing control chip 410. The timing control chip 410 and the microcontroller 420 are respectively coupled to a host system to receive control signals from the host system. The microcontroller 420 is further coupled to a flash memory 430 and a read-only memory 440, so as to store data parameters required for the operation of the controller 420 in the flash memory 430, or read setting parameters required for operation from the read-only memory 440.

In particular, when performing the state switching operations of FIG. 4A and FIG. 4B in timing, the timing control chip 410 and the microcontroller 420 may be synchronized in timing. Namely, a frame rate that the light sensor 210 performs scanning may be synchronized with a switching frequency of the diffraction suppression device 300 as shown in FIG. 4A and FIG. 4B. For example, during a scanning period of one frame of the light sensor 210, the diffraction suppression device 300 may implement switching of FIG. 4A and FIG. 4B by multiple times, so as to effectively reduce the influence of the diffraction effect on the image quality.

Other embodiments will be listed below to describe the invention in detail, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 6:
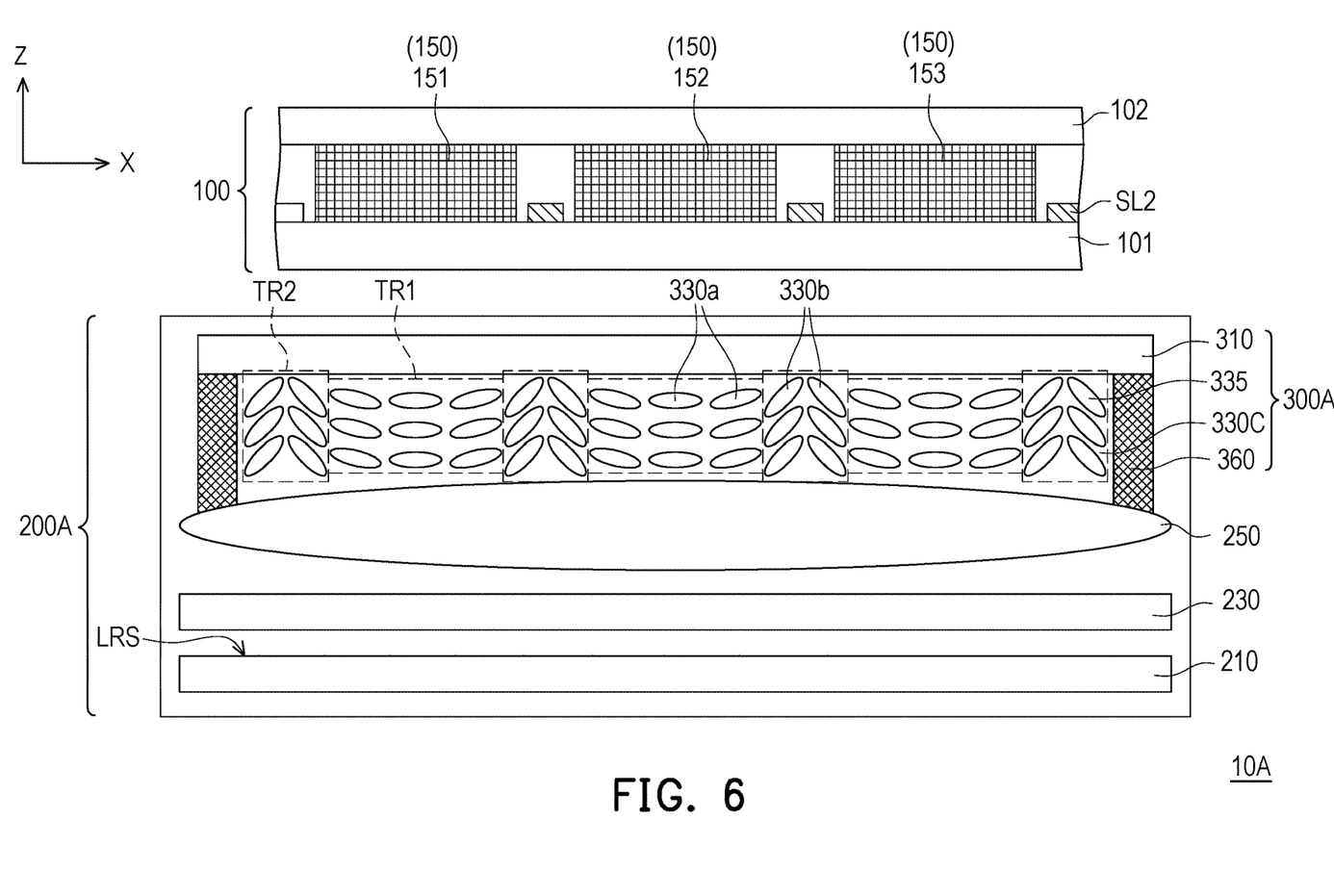
FIG. 6 is a schematic cross-sectional view of a display apparatus according to a second embodiment of the invention.

FIG. 6 is a schematic cross-sectional view of a display apparatus according to a second embodiment of the invention. Referring to FIG. 6, a difference between a display apparatus 10A and the display apparatus 10 of FIG. 2 is that a diffraction suppression device 300A of the display apparatus 10A is integrated in a camera module 200A. For example, in the embodiment, the substrate 310 of the diffraction suppression device 300A and the lens 250 of the camera module 200A may be connected through an adhesive pattern 360 to form a sealed chamber, and the sealed chamber is filled with a liquid crystal layer 330C to form a liquid crystal lens element with a low diffraction effect. Accordingly, an overall thickness of the display device 10A may be further reduced.

Since the structure of the diffraction suppression device 300A of the embodiment and the technical effects thereof are all similar to that of the diffraction suppression device 300 of FIG. 2, detailed description thereof may be deduced by referring to the relevant paragraphs of the above embodiments, which will not be repeated.

Figure 7:
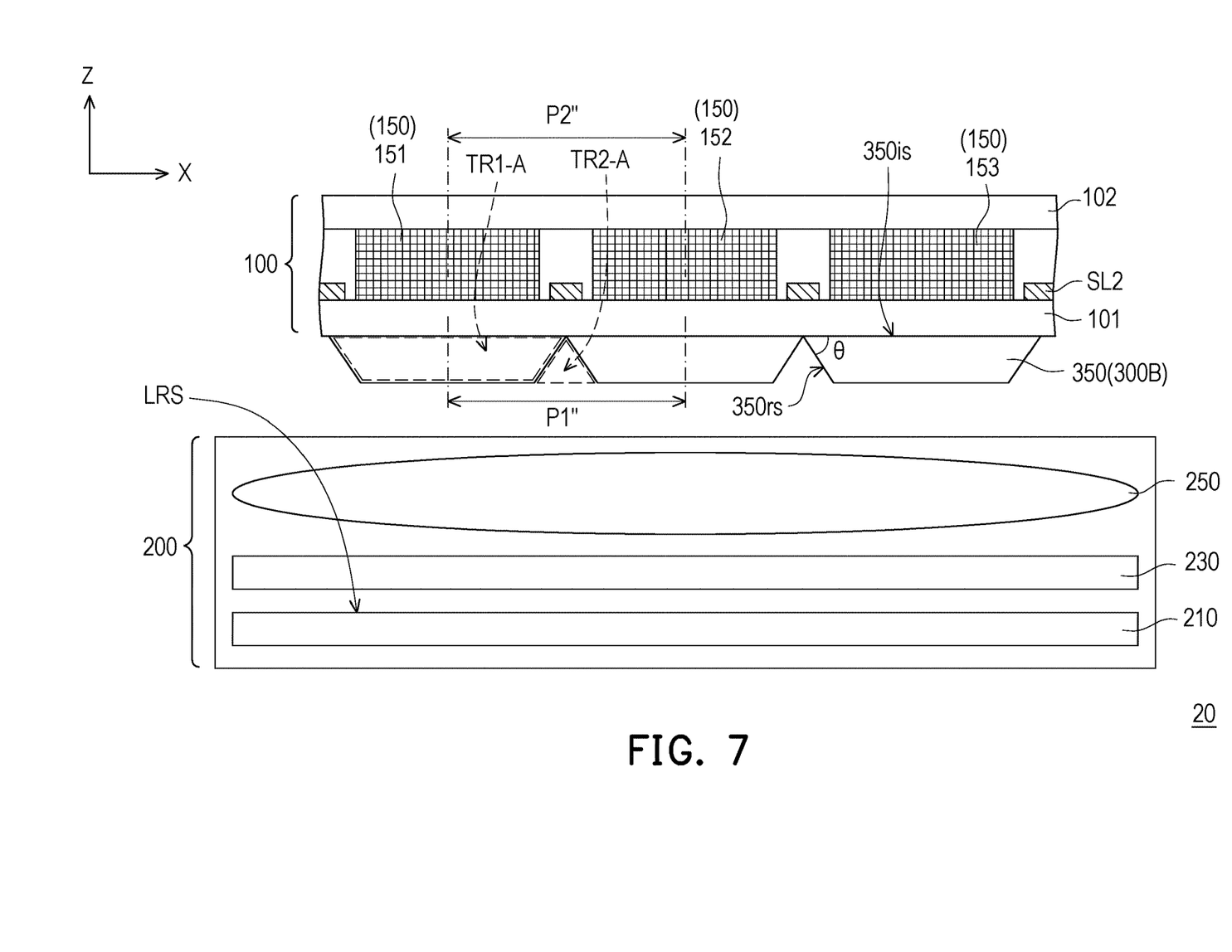
FIG. 7 is a schematic cross-sectional view of a display apparatus according to a third embodiment of the invention.

FIG. 7 is a schematic cross-sectional view of a display apparatus according to a third embodiment of the invention. Referring to FIG. 7, a difference between a display apparatus 20 of the embodiment and the display device 10 of FIG. 2 is that the diffraction suppression device has a different composition. To be specific, in the embodiment, a diffraction suppression device 300B of the display device 20 uses multiple light guide structures 350 instead of the liquid crystal layer 330 in FIG. 2 to change a light path of the incident light. The light guide structures 350 are respectively arranged corresponding to multiple first light-transmitting regions TR1-A. In other words, the light guide structures 350 define the first light-transmitting regions TR1-A. Preferably, an arrangement pitch P1" of the light guide structures 350 along the direction X may be equal to an arrangement pitch P2" of the display pixels 150 of the display panel 100 along the direction X.

In the embodiment, there is a space between any two adjacent light guide structures 350, which may be defined as a second light-transmitting region TR2-A of the diffraction suppression device 300B and is filled with air. Namely, in the embodiment, the first refractive index of the diffraction suppressing element 300B in the first light-transmitting region TR1-A is greater than the second refractive index in the second light-transmitting region TR2-A. A material of the light guide structure 350 includes, for example, glass, quartz glass, or polymers (such as poly(methyl methacrylate), PMMA), polyethylene terephthalate (PET) or polycarbonate (PC)).

The light guide structure 350 has a light incident surface 350is facing the display panel 100 and a refractive surface 350rs facing the second light-transmitting region TR2-A. The refractive surface 350rs and the light incident surface 350is are connected with each other and have an included angle θ. Preferably, the included angle θ may be within a range of 30 degrees to 60 degrees.

For example, when the light that passes through the display panel 100 and enters the light guide structure 350 at a relatively large angle is transmitted to the refractive surface 350rs, since the refractive index of the light guide structure 350 is greater than that of air, the light path of the light will be deflected by the refractive surface 350rs, and transformed into a more straight light path. Accordingly, the diffraction effect generated by the light passing through the display panel 100 is suppressed, thereby improving the image photographing quality of the under-screen camera module.

Figure 8:
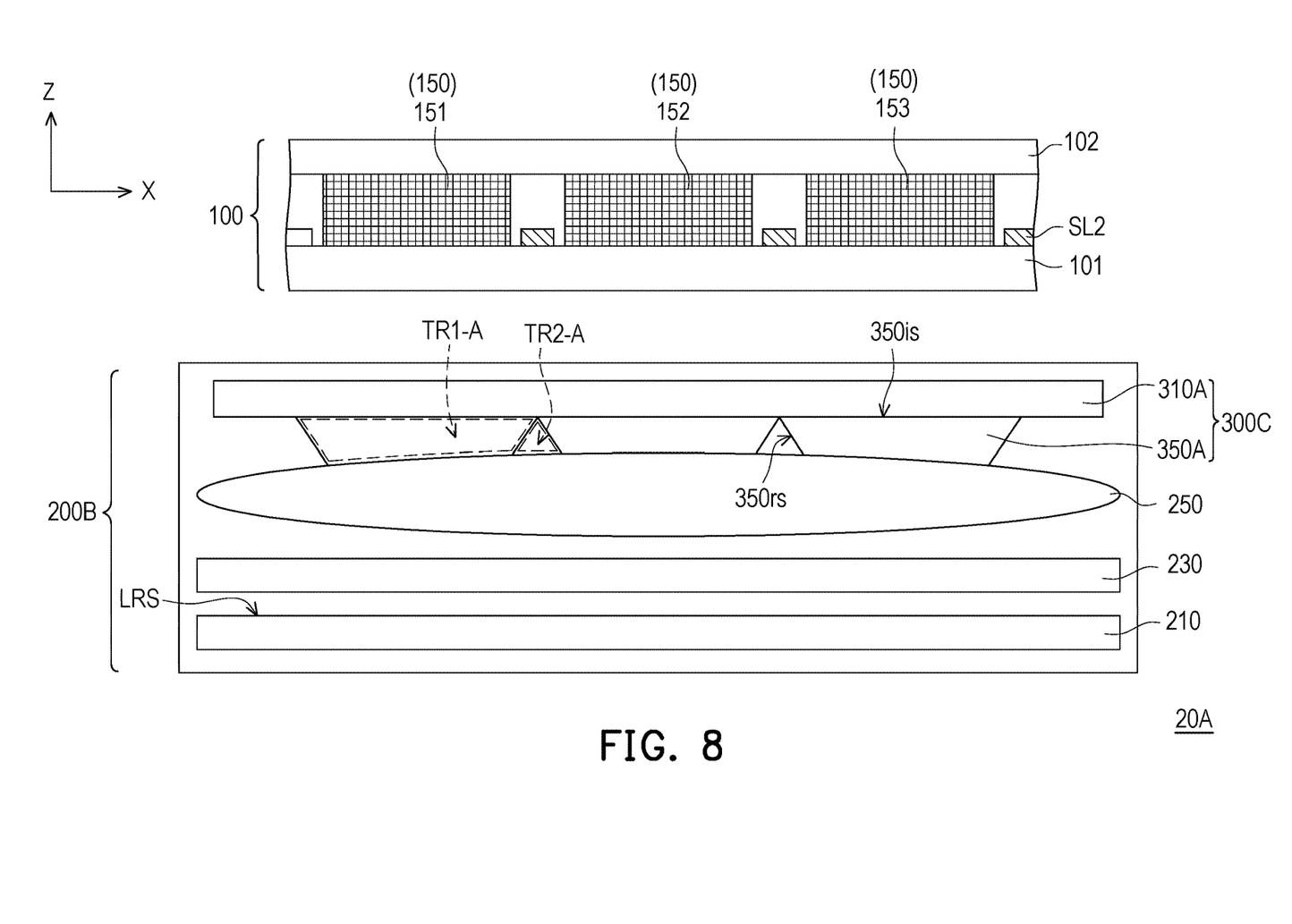
FIG. 8 is a schematic cross-sectional view of a display apparatus according to a fourth embodiment of the invention.

FIG. 8 is a schematic cross-sectional view of a display apparatus according to a fourth embodiment of the invention. Referring to FIG. 8, a difference between a display apparatus 20A of the embodiment and the display device 20 of FIG. 7 is that a diffraction suppression device 300C of the display apparatus 20A is integrated in a camera module 200B. For example, in the embodiment, multiple light guiding structures 350A of a diffraction suppression device 300C may be disposed between a substrate 310A and the lens 250 of the camera module 200A, and directly contact the lens 250 to form a light guide lens element with a low diffraction effect. Through such integration, an overall thickness of the display device 20A may be further reduced.

Since the structure of the diffraction suppression device 300C of the embodiment and the technical effects thereof are all similar to the diffraction suppression device 300B of FIG. 7, detailed description thereof may be deduced by referring to the relevant paragraphs of the above embodiments, which will not be repeated.

In summary, in the display apparatus of an embodiment of the invention, the diffraction suppression device is disposed between the display panel and the camera module. The diffraction suppression device has the first light-transmitting regions arranged by overlapping the display pixels of the display panel and the second light-transmitting regions arranged between the display pixels. Since the refractive index of the first light-transmitting region is greater than that of the second light-transmitting region, a light path of light is deflected after the light passes through the first light-transmitting region, thereby suppressing the diffraction phenomenon of the light generated after passing through the display pixels of the display panel, which helps to improve the image photographing quality of the under-screen camera module.

What is claimed is:

1. A display apparatus, comprising:
a display panel, provided with a plurality of signal lines and a plurality of display pixels, wherein the signal lines and the display pixels are alternately arranged along at least one direction;
a camera module, having a light receiving surface facing the display panel, wherein the light receiving surface is overlapped with the display panel; and
a diffraction suppression device, disposed between the display panel and the camera module, and having a plurality of first light-transmitting regions and a plurality of second light-transmitting regions alternately arranged along the at least one direction, wherein the first light-transmitting regions are respectively overlapped with the display pixels, the second light-transmitting regions are respectively overlapped with the signal lines, the diffraction suppression device has a first refractive index in the first light-transmitting regions and has a second refractive index in the second light-transmitting regions, and the first refractive index is greater than the second refractive index,
wherein the diffraction suppression device comprises a liquid crystal layer, the liquid crystal layer comprises a plurality of first portions respectively disposed in the first light-transmitting regions and a plurality of second portions respectively disposed in the second light-transmitting regions, and an arrangement pitch of the first portions along the at least one direction is equal to an arrangement pitch of the display pixels along the at least one direction.

2. The display apparatus according to claim 1, wherein the diffraction suppression device further comprises at least one substrate, and an orthogonal projection area of each of the first portions and the second portions of the liquid crystal layer on the at least one substrate changes over time.

3. The display apparatus according to claim 2, wherein the display pixels comprise a first display pixel and a second display pixel adjacent to each other, and in a first time interval, an orthogonal projection area of one of the first portions overlapped with the first display pixel on the at least one substrate is greater than an orthogonal projection area of another one of the first portions overlapped with the second display pixel on the at least one substrate.

4. The display apparatus according to claim 3, wherein in a second time interval, the orthogonal projection area of the one of the first portions overlapped with the first display pixel on the at least one substrate is smaller than the orthogonal projection area of the another one of the first portions overlapped with the second display pixel on the at least one substrate.

5. The display apparatus according to claim 4, wherein the camera module performs one image capture in the first time interval and the second time interval.

6. A display apparatus, comprising:
a display panel, provided with a plurality of signal lines and a plurality of display pixels, wherein the signal lines and the display pixels are alternately arranged along at least one direction;
a camera module, having a light receiving surface facing the display panel, wherein the light receiving surface is overlapped with the display panel; and
a diffraction suppression device, disposed between the display panel and the camera module, and having a plurality of first light-transmitting regions and a plurality of second light-transmitting regions alternately arranged along the at least one direction, wherein the first light-transmitting regions are respectively overlapped with the display pixels, the second light-transmitting regions are respectively overlapped with the signal lines, the diffraction suppression device has a first refractive index in the first light-transmitting regions and has a second refractive index in the second light-transmitting regions, and the first refractive index is greater than the second refractive index,
wherein the camera module comprises:
a light sensor, provided with the light receiving surface; and
a lens, disposed on one side of the light receiving surface of the light sensor, and overlapped with the light receiving surface, wherein the diffraction suppression device is integrated in the camera module and comprises a substrate and a liquid crystal layer, and the liquid crystal layer is clamped between the substrate and the lens.

7. The display apparatus according to claim 6, wherein the substrate of the diffraction suppression device and the lens of the camera module are connected through an adhesive pattern to form a sealed chamber, and the sealed chamber is filled with the liquid crystal layer.

8. The display apparatus according to claim 6, wherein the light sensor is coupled to a microcontroller, the diffraction suppression device is coupled to a timing control chip, and the microcontroller and the timing control chip are synchronized in timing.

9. The display apparatus according to claim 6, wherein the camera module further comprises a filter, disposed between the light sensor and the lens.

10. A display apparatus, comprising:
   a display panel, provided with a plurality of signal lines and a plurality of display pixels, wherein the signal lines and the display pixels are alternately arranged along at least one direction;
   a camera module, having a light receiving surface facing the display panel, wherein the light receiving surface is overlapped with the display panel; and
   a diffraction suppression device, disposed between the display panel and the camera module, and having a plurality of first light-transmitting regions and a plurality of second light-transmitting regions alternately arranged along the at least one direction, wherein the first light-transmitting regions are respectively overlapped with the display pixels, the second light-transmitting regions are respectively overlapped with the signal lines, the diffraction suppression device has a first refractive index in the first light-transmitting regions and has a second refractive index in the second light-transmitting regions, and the first refractive index is greater than the second refractive index, wherein
   the first light-transmitting regions of the diffraction suppression device are respectively provided with a plurality of light guide structures; and
   each of the light guide structures has a refractive surface facing one of the second light-transmitting regions and a light incident surface facing the display panel, the refractive surface and the light incident surface are connected with each other and have an included angle, and the included angle is within a range of 30 degrees to 60 degrees.

11. A display apparatus, comprising:
   a display panel, provided with a plurality of signal lines and a plurality of display pixels, wherein the signal lines and the display pixels are alternately arranged along at least one direction;
   a camera module, having a light receiving surface facing the display panel, wherein the light receiving surface is overlapped with the display panel; and
   a diffraction suppression device, disposed between the display panel and the camera module, and having a plurality of first light-transmitting regions and a plurality of second light-transmitting regions alternately arranged along the at least one direction, wherein the first light-transmitting regions are respectively overlapped with the display pixels, the second light-transmitting regions are respectively overlapped with the signal lines, the diffraction suppression device has a first refractive index in the first light-transmitting regions and has a second refractive index in the second light-transmitting regions, and the first refractive index is greater than the second refractive index, wherein
   the first light-transmitting regions of the diffraction suppression device are respectively provided with a plurality of light guide structures; and
   the camera module comprises:
      a light sensor, provided with the light receiving surface; and
      a lens, disposed on one side of the light receiving surface of the light sensor, and overlapped with the light receiving surface, wherein the diffraction suppression device is integrated in the camera module, and the light guide structures are connected to the lens.

12. The display apparatus according to claim 11, wherein the camera module further comprises a filter, disposed between the light sensor and the lens.

* * * * *